Aug. 12, 1930.     H. M. BASCOM     1,772,508
VOLTAGE LIMITING DEVICE

Filed Oct. 27, 1925

INVENTOR
H. M. Bascom
BY
ATTORNEY

Patented Aug. 12, 1930

1,772,508

UNITED STATES PATENT OFFICE

HENRY M. BASCOM, OF BROOKLYN, NEW YORK, ASSIGNOR TO AMERICAN TELEPHONE AND TELEGRAPH COMPANY, A CORPORATION OF NEW YORK

VOLTAGE-LIMITING DEVICE

Application filed October 27, 1925. Serial No. 65,248.

This invention relates to voltage limiting devices, and particularly to means for preventing excessive voltages from being applied by a source of potential to an output circuit.

It has long been known that a storage battery may be directly charged from a direct current lighting main through a series resistance, the series resistance being employed to regulate the rate of flow of current to the storage battery. Such a system for charging storage batteries has not been very desirable because of the possibility of obtaining the full line potential of the lighting main across the terminals of the storage battery if the storage battery for any reason should become open circuited.

It is therefore an object of this invention to provide arrangements for limiting the voltage that may be applied by a direct current source of potential to an output circuit across which a storage battery is connected.

It is another object of this invention to insert an electrolytic device in parallel with a storage battery which is connected across the terminals of a direct current source of potential so as to limit the maximum voltage which may be obtained across the terminals of the storage battery if the storage battery should for any reason become open circuited.

An electrolytic device, such as has been commonly employed heretofore for rectifiers, lightning arresters, electrolytic condensers, etc., consists generally of a cell which has a pair of electrodes, an anode and a cathode, of different materials immersed in a suitable electrolyte. The anode is connected to the positive side of the source of potential and the cathode to the negative side. The theory generally accepted to explain the behaviour of such a cell is that in operation, the anode is surrounded by a unidirectionally conducting gaseous film which, under normal conditions, prevents the flow of current from the anode to the cathode. When the potential between the anode and the cathode exceeds a critical or predetermined value, the film surrounding the anode breaks down and no longer retards the flow of current from the anode to the cathode. This critical or predetermined voltage varies over a wide range of values, depending upon the nature of the electrolyte, the chemical composition of the anode and of the cathode, the past history of the electrodes, etc. It is possible to make an electrolytic device of this type with a breakdown potential somewhat above the potential employed in an electrical system, so that voltages in excess of the breakdown voltage of the electrolytic device will never be applied to the electrical system.

Figure 1:
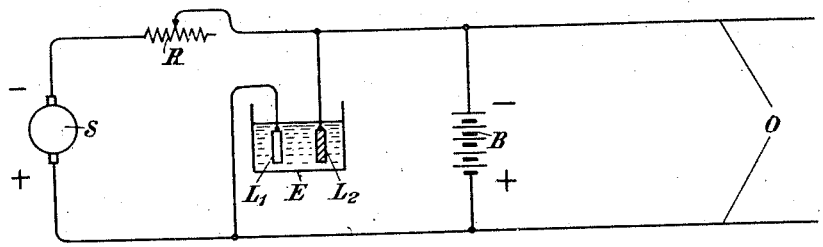
Figure 2:
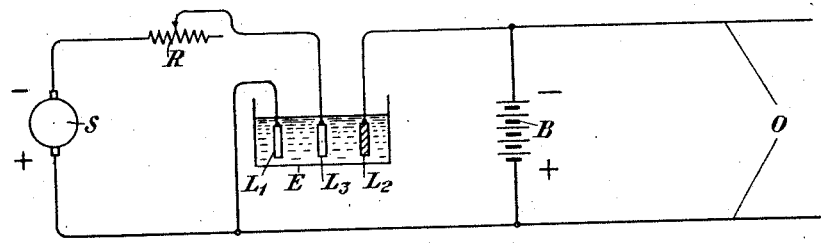
Figure 3:
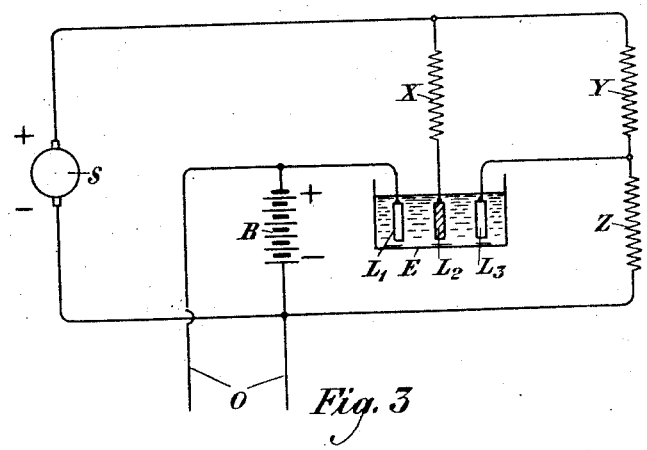

While the nature of the invention will be pointed out with particularity in the appended claims, the invention itself, both as to its objects and features, will be better understood from the detailed description hereinafter following when read in connection with the accompanying drawing, in which Figures 1, 2 and 3 represent various embodiments of the invention. Similar parts will be represented by similar reference characters wherever they appear throughout the drawing.

Referring to Fig. 1, a source of direct current potential S is shown, which is used to electrically charge a storage battery B. A rheostat R is arranged in series with the source of potential S so as to regulate the rate of charge of the storage battery B by the source of potential S. The terminals of the storage battery B are connected by means of the leads O to an output circuit (not shown). An electrolytic device E is connected in parallel with the storage battery B, the electrolytic device consisting of two electrodes $L_1$ and $L_2$ which may be, for example, tantalum and lead, respectively, immersed in a suitable electrolyte, for example, sulphuric acid $H_2SO_4$. It will be understood that other electrodes may be conveniently employed in the place of the electrodes referred to, the electrolyte being chosen with due regard to the nature of the electrodes.

When the source of potential S is charging the storage battery B, the anode $L_1$ is surrounded by a unilaterally conducting gaseous film, which normally prevents the flow of current from the anode $L_1$ to the cathode $L_2$. But when the potential existing between the anode $L_1$ and the cathode $L_2$ is greater than a predetermined value, the film which normally surrounds the anode $L_1$ breaks down and permits the flow of current from the anode $L_1$ to the anode $L_2$, thereby preventing a potential above the predetermined value from being applied to the leads O connected to the output circuit. If for any reason the storage battery B becomes open-circuited, a potential above this predetermined value cannot be applied to the leads O connected to the output circuit by virtue of the presence of the electrolytic device E.

The arrangement shown in Fig. 2 prevents voltages in excess of the predetermined value from being applied to the output circuit connected to the leads O when the storage battery B for any reason becomes open circuited even though the electrolyte of the electrolytic device E has evaporated or run out. In the electrolytic device shown in this figure, three electrodes are employed instead of the two of Fig. 1. The electrodes $L_1$ and $L_3$ are different in chemical composition from the electrode $L_2$, but the electrodes $L_1$ and $L_3$ may or may not be of the same chemical composition. Electrodes $L_1$ and $L_3$ may be, for example, of tantalum, while electrode $L_2$ may be, for example, of lead, the electrolyte being the same as before, sulphuric acid $H_2SO_4$.

While the battery B is being charged by the direct current source of potential S, current normally flows from the electrode $L_2$ to the electrode $L_3$. The anode $L_1$ remains inactive until a voltage in excess of a predetermined value is impressed across the anode $L_1$ and either of the electrodes $L_2$ or $L_3$. But when a voltage in excess of the predetermined value is impressed across the electrodes $L_1$ and either $L_2$ or $L_3$, the unilaterally conducting gaseous film which surrounds anode $L_1$ breaks down so as to prevent this excessive voltage from being applied to the output circuit connected to the leads O.

An advantage which the arrangements in Fig. 2 have over the arrangements in Fig. 1, is that the storage battery B is prevented from discharging back into the mains leading to the source of potential S when the source of potential S fails. This discharge of the storage battery B is thus prevented by virtue of the fact that the electrode $L_3$ is made preferably of tantalum and hence, under normal conditions, current cannot flow from the electrode $L_3$ to the electrode $L_2$.

A further advantage which the arrangements in Fig. 2 have over the arrangements in Fig. 1 is that when the electrolyte of the electrolytic cell E either evaporates or runs out the full line potential of the source S cannot be impressed either across the storage battery B or across the output circuit connected to the leads O. This occurs when the circuit including electrodes $L_3$ and $L_2$ opens by virtue of the depletion of the electrolyte.

In Fig. 3 there is shown another system for preventing excessive voltages from being applied to the output circuit connected to the leads O when the storage battery B becomes open-circuited. In the arrangements of this figure, resistances Y and Z are proportioned so as to place the tantalum electrode $L_3$ at a potential slightly above the potential at which the lead electrode $L_2$ and the tantalum electrode $L_1$ normally operate, all three electrodes being immersed in sulphuric acid $H_2SO_4$. If the potential at which the output circuit connected to the leads O is to be operated at, for example, 17 volts, then the resistances Y and Z are proportioned so as to place the electrode $L_3$ at a potential of, for example, about 20 volts. And under normal conditions the battery B is charged by current flowing from the source of potential S through a resistance X, and through the electrodes $L_2$ and $L_1$.

If it is assumed that the normal potential of the storage battery B is about 17 volts, the electrode $L_3$ will, under normal conditions, be positive with respect to electrodes $L_1$ and $L_2$, and hence, no current will flow either from or to electrode $L_3$. If the storage battery B should for any reason become open-circuited, the potential of the electrode $L_2$ will exceed the potential of the electrode $L_3$, thereby placing the electrode $L_3$ at a negative potential with respect to the electrode $L_2$. Under this condition it follows that current will flow from the lead electrode $L_2$ to the tantalum electrode $L_3$ by virtue of the fact that the potential of the electrode $L_2$ is above the potential of the electrode $L_3$.

The resistances X and Z have magnitudes such that under this condition of current flow the potential existing at electrode $L_2$, which is substantially the same as the potential existing at the output lead connected to the electrode $L_1$, is below a predetermined safe operating value potential for the output circuit. In order to prevent excessive voltages from being applied to the output circuit, the operation of this system takes place because of a reversal of the polarities of the electrodes, whereas in Figs. 1 and 2 the operation takes place because of an actual breaking down of the unidirectional conducting films on the anodes. When the electrolyte of the electrolytic cell either evaporates or runs out the full line potential of the source S cannot be impressed either across the storage battery B or across the output circuit connected to the leads O.

It will be understood that while a particular type of electrolytic device has been shown and described, the invention is not limited to such a device, but that any other electrolytic device may be employed having different electrodes from those employed in this invention, the electrolyte being chosen to suit the nature of the electrodes employed.

It will also be understood that it is within the scope of this invention to employ thermionic vacuum tubes having a proper number of electrodes with characteristics similar to those of the electrodes of the electrolytic devices described herein.

While the invention has been disclosed in certain particular arrangements which are deemed desirable, it is to be understood that it is capable of embodiment in other and widely varied organizations without departing from the spirit of the invention and the scope of the appended claims.

What is claimed is:

1. In combination, a source of electromotive force, an output circuit, circuit means for regulating the flow of current from said source of electromotive force to said output circuit, and an electrolytic device interconnecting said source of electromotive force and said output circuit, said electrolytic device permitting the normal flow of current unidirectionally from said source of electromotive force to said output circuit and short-circuiting said source of electromotive force when the potential exceeds a predetermined value.

2. In combination, a source of electromotive force, an output circuit, circuit means for regulating the flow of current from said source of electromotive force to said output circuit, and an electrolytic device interconnecting said source of electromotive force and said output circuit, said electrolytic device having electrodes immersed in a suitable electrolyte to permit the unidirectional flow of current from said source of electromotive force to said output circuit when the potential of said electrodes is below a predetermined value and to short-circuit said source of electromotive force when the potential of said electrodes is above the predetermined value.

3. A voltage limiting device comprising an electrolytic cell having three electrodes immersed in a suitable electrolyte, two of said electrodes permitting the unidirectional flow of current therebetween when the magnitude of the potential between either of said two electrodes and the third electrode is below a predetermined value, said third electrode remaining inactive until said potential exceeds the predetermined value at which time the flow of current between the first two electrodes will be interrupted by current flowing from the third electrode to one of the other two electrodes.

4. A voltage limiting device interconnecting a source of potential and an output circuit, said device comprising an electrolytic cell having three electrodes all immersed in an electrolyte, two of said electrodes permitting the unilateral conduction of current therebetween, and a third electrode and one of the other electrodes forming a path which short-circuits the path between the first two electrodes when the potential across said third electrode and the other electrode exceeds a predetermined value.

5. A voltage limiting device interconnecting a source of potential and an output circuit, comprising an electrolytic cell having an electrolyte in which two electrodes are immersed to conduct current unidirectionally between said source of potential and said output circuit, and in which a third electrode also is immersed to conduct current between said third electrode and one of the other electrodes when the potential applied to said latter electrodes is greater than a predetermined value.

6. A voltage limiting device interconnecting a source of potential and an output circuit, comprising an electrolytic cell having an electrolyte in which three electrodes are immersed, two of said electrodes conducting current unidirectionally between said source of potential and said output circuit, and the third electrode normally having a film surrounding it which breaks down when the potential existing between said third electrode and either of the other two electrodes is greater than a predetermined value so as to interrupt the current between said other electrodes.

7. In combination, a storage battery, means to charge said storage battery, an output circuit into which said storage battery discharges, and a three electrode electrolytic device interconnecting said storage battery and said charging means for limiting the potential applied to said storage battery, said electrolytic device transmitting unidirectional current between said charging means and said storage battery, the circuit leading to said output circuit being broken by the electrodes of said electrolytic device when the electrolyte thereof becomes depleted.

8. In an electrical charging system, the combination of a supply circuit, a storage battery, an electrolytic device having three electrodes, one of which is of different chemical composition from the other two, means for effectively connecting said device in series between said supply circuit and said storage battery at all times when the voltage of the supply circuit is below a predetermined value, and means for effectively connecting said device in parallel with said supply circuit at all times when the voltage of said supply circuit is above the predetermined value.

9. The combination of a supply circuit, a storage battery, an electrolytic device to transmit current from said supply circuit to said storage battery for charging said storage battery, and means associated with said electrolytic device for shunting said supply circuit to prevent current from said supply circuit from being supplied to said storage battery whenever the voltage of said supply circuit exceeds a predetermined value.

10. The combination of a supply circuit, a storage battery, an electrolytic device having three electrodes, two electrodes being anodes and one a cathode, means for effectively connecting said supply circuit and said storage battery in series between the cathode of said electrolytic device and one of its anodes so that current may be fed from the supply circuit through said electrolytic device to the storage battery for charging the storage battery, and means for effectively connecting said supply circuit across the cathode of said electrolytic device and its other anode whenever the voltage of the supply circuit exceeds a predetermined value, thereby preventing current from flowing from the supply circuit to the storage battery.

11. The combination of a supply circuit, an output circuit, and an electrolytic device having three terminals, two of which are anodes and one a cathode, one of the anodes being connected jointly to the positive terminals of said supply and output circuits, the other of the anodes being connected to the negative terminal of said supply circuit, said cathode being connected to the negative terminal of said output circuit.

In testimony whereof, I have signed my name to this specification this 24th day of October, 1925.

HENRY M. BASCOM.